3,491,053
METHOD OF PREPARING A POLYURETHANE
GEL AND THE COMPOSITION PREPARED
THEREFROM
Erwin Sommer, Obernburg, Klaus Gerlach, Obernau, Klaus Boehme and Werner Riess, Erlenbach, and Friedrich Dangl, Mechenhard, Germany, assignors to Glanzstoff AG, Wuppertal, Germany
No Drawing. Filed Dec. 15, 1966, Ser. No. 607,592
Claims priority, application Germany, Dec. 17, 1965,
V 29,954
Int. Cl. C08g 41/00
U.S. Cl. 260—30.8                              13 Claims

ABSTRACT OF THE DISCLOSURE

This invention is directed to a composition comprising a polyurethane dissolved in an organic solvent, such as dimethyl formamide, and ammonium nitrate in an amount sufficient to gel the polyurethane. The invention also provides a method of preparing a polyurethane gel wherein excess liquid solvent is removed after the ammonium nitrate has been added and the gel has formed. Further steps provide an open-channeled microporous polyurethane coating by applying the gel to a substrate and then washing with water to harden the polyurethane and to remove solvent contained in the gel. The resulting coating is particularly useful as the surface layer of an artificial leather product.

---

In the production of an artificial leather product, the backing or substrate is usually a fibrous material such as a woven fabric or preferably a non-woven fleece web which is held together by an elastomeric binding agent. These fabrics or non-woven webs serve only as a base layer for a relatively thick polymer coating or superimposed layer which is required to impart the leather-like feel and appearance of leather to the finished product. In most applications for artificial leather products, particularly in shoes, boots or other clothing materials, the outer surface layer of a suitable polymer must also possess other essential properties. For example, the finished artificial leather product must exhibit good permeability for water vapor in such a manner that no water vapor is entrapped or stored within the layers of the artificial leather. At the same time, the outer surface layer must provide a seal against the passage of liquid water.

When using non-woven fibrous webs or fleeces bound with a suitable polymer binding agent as the substrate, the resulting structure is quite permeable and presents no problem with respect to a temporary storage of water vapor and then passing it off again at the surfaces of the structure. However, such structures are generally quite permeable to liquid water and have a fibrous surface which does not give the appearance of leather. For this reason, the polymer bound non-woven webs are usually coated with a fiber-free polymer surface film or layer which has a leather-like appearance and which is impermeable to liquid water.

Many methods have been suggested for producing a polymer surface layer or coating having a porous structure which is permeable to water vapor. Most of these methods follow a uniform scheme, i.e., one employs a two-phase system in which the polymer represents one of the phases in the form of a solution or dispersion, and the two-phase composition is first brushed or coated onto a substrate and the polymer is then solidified through drying, hardening or coagulation to give a layer of the desired thickness. Subsequently, the second phase is removed from the solidified layer by evaporation, vaporization, leaching or a similar process. This results in a porous polymer structure, preferably with very fine pores which are permeable to water vapor but which effectively seal out liquid water.

Thus, there are known methods in which an insoluble solid salt is added to a solution of a synthetic polymer to form a two-phase solid-liquid system, the salt being insoluble in the solvent for the synthetic polymer. This polymer solution containing the dispersed solid salt is then poured onto a substrate to form a liquid layer, after which the solvent is evaporated to form a polymer film and the salt is then washed out of this film. By washing or leaching out the salt, an open porous polymer structure is obtained which permits water vapor permeability provided that the individual pores are connected with one another. However, this method generally leads to relatively coarse pores which are still visible to the naked eye because the salts used in the process cannot be ground sufficiently fine and individual agglomerations of salt grains in the solution often occur. In addition, the leaching procedure is quite time-consuming, and it is difficult to obtain a uniformly porous material. Furthermore, some of the salt grains are completely coated by the polymer and therefore cannot be washed out of the polymer film or layer so as to be retained therein as an undesirable impurity.

Similar methods have been described in which fibers have been used as the solid phase in the liquid polymer solution, for example by using polyvinyl alcohol fibers which can be eliminated after forming the coating or film on a substrate. Again, one obtains a relatively coarse porous structure with the same disadvantages as when using solid salts as described above.

Other methods are known in which a vaporizable material is employed as the second phase of the two-phase coating composition. For example, one method is known in which ammonium bicarbonate is mixed in solid form with a polymer solution, the solution is then applied to a substrate and dried, and the ammonium bicarbonate is then vaporized by heating the film. In this case, it is also impossible to completely remove the ammonium bicarbonate from the film. Furthermore, the amount of this vaporizable material added to the polymer solution must be sufficiently large so that most of the particles enclosed by the polymer are connected with one another, since otherwise it is impossible to achieve permeability to water vapor. However, with the large amounts of the vaporizable material, the resulting film or coating has more of a foam structure with a large pore volume and little stability rather than a dense, sturdy, water-vapor permeable layer.

Similar two-phase systems involve the use of a plasticized polyvinyl chloride paste which contains propellants or blowing agents as the second solid phase. In this case, the formation of the pores is caused by the generation of gas from the propellant during solidification of the polyvinyl chloride paste. With this foaming technique, an open-pored structure is produced which is not only permeable to water vapor but is also permeable to liquid water because of the relatively large size of the pores. Such foamed structures are completely unsuitable as coatings which are to form a liquid seal.

It is therefore highly desirable to produce coatings or films having a microporous, open-channeled structure so as to provide the necessary liquid seal while still being permeable to water vapor. Very good results in obtaining such microporous structures are possible if polymer gels are used for the production of the coating or film layer.

In general, a gel may be viewed as a two-phase system in which at least one substance is uniformly dispersed in another substance, both the dispersed substance and the dispersion medium being continuous or coherent phases which penetrate one another. In other words, there is a uniform dispersion of two distinct phases, i.e. the dispersed substance and the dispersion medium, but each phase forms a complete totality in itself so that one can speak of a continuous or coherent phase. The continuous or coherent characteristic of a gel can also be identified by the fact that one can proceed from one point to any other point in the dispersed phase without ever leaving this phase, i.e. without passing over into the dispersion medium at any time whatsoever. In the opposite sense, a path can be traced completely through the dispersion medium as a single continuous phase without passing over into the dispersed phase. (See, for example, J. Stauff, "Kolloidchemie," Springer-Verlag (1960), page 666.)

It will be apparent that one can obtain extremely uniform porous structures containing a network of extremely fine open channels if a polymer gel can be produced in which the polymer represents the dispersed phase which can be solidified or hardened and the dispersion medium is the second phase then removed from the solidified structure. Such a polymer gel has been described in Belgian Patent No. 624,250. This patent discloses a method in which a polymer solution is first prepared, preferably polyurethane and dimethyl formamide, to which there is then added a liquid which is not a solvent for the polymer but which must be miscible or at least partially miscible with the solvent employed in preparing the polymer solution. The non-solvent liquid is added up to the point where the mixture separates into a polymer gel portion and a liquid portion. The liquid portion which has separated out from the mixture is then removed from the gel by centrifuging, and the gel is then coated or brushed in appropriate aggregate layers onto a substrate. By means of further treatment with the non-solvent liquid, the polymer gel is then coagulated or hardened and the solvent dispersion medium in the gel is washed out to form a microporous structure.

Although this known method leads to good results in terms of the resulting porous polymer coating, it possesses a number of disadvantages which reduce its economical utility. For example, water is highly preferred as the liquid non-solvent in forming the polymer gel. However, it is quite difficult to add water to the polymer solution without causing a precipitate of the polymer gel immediately at the point at which the water is introduced. This results in a non-uniform precipitation or gelling of the polymer which later appears quite conspicuously as a non-homogeneous portion of the polymer film or coating. For this reason, the above-noted Belgian patent prescribes that the liquid non-solvent such as water must be diluted with the solvent for the polymer before addition to the polymer solution. However, this requires a large excess of the solvent for the polymer in addition to that employed to make up the polymer solution. Although the Belgian patent indicates that the entire quantity of polymer solvent can be economically recovered, tests have shown that one does not recover much more solvent than the quantity which was required for the dilution of the non-solvent gelling agent.

One object of the present invention is to provide a novel composition which produces a polyurethane gel capable of being easily treated to form a microporous, open-channeled polymer structure in the form of a film or coating which is permeable to water vapor but provides a seal against liquid water.

Another object of the invention is to provide a method for the preparation of a coatable or brushable polyurethane gel and also the formation of the gel into a microporous, open-channeled film or coating on a flat substrate, the preparation of the gel and the polymer coating being accomplished in an economical manner and leading to a homogeneous and uniformly microporous product.

A more specific object of the invention is to provide a polyurethane gel which can be coated onto a flat substrate, preferably a bonded, non-woven fibrous web, and then hardened to form a microporous surface so as to yield a finished product having excellent leather-like properties.

These and other objects and advantages of the invention will become more apparent upon consideration of the following detailed specification.

It has now been found, in accordance with the present invention, that the foregoing objects can be achieved by means of a novel composition comprising a polyurethane dissolved in an organic solvent and ammonium nitrate in an amount sufficient to cause the polyurethane to gel. In order to prepare the polyurethane gel the polyurethane is dissolved in a suitable organic solvent, ammonium nitrate is then added to the polyurethane solution in a quantity sufficient to gel the polyurethane, and excess organic solvent which separates as a liquid phase from the gel is then removed, preferably by centrifuging or evaporation. The ammonium nitrate can be added either as a solution in the same organic solvent used to dissolve the polyurethane or else the ammonium nitrate can be added as a solid material to the polyurethane solution. In either case, the concentration of polyurethane and ammonium nitrate in the solvent are not particularly critical, and depending upon the initial concentration of the polyurethane and the quantity of ammonium nitrate added thereto, one obtains a gel of a more or less viscous consistency capable of being brushed or coated onto a flat substrate. After applying the gel produced in this manner as a coating onto the substrate, it can then be treated with water which acts in a known manner to harden the polyurethane and to wash out the solvent phase of the gel to form an open-channeled microporous polyurethane structure. The finished polyurethane coating or film obtained in this manner contains an open-pored structure capable of providing good permeability for water vapor while also being sufficiently microporous to prevent the passage of liquid water.

In general, the gel point of the polyurethane depends upon the amount of ammonium nitrate added to the polyurethane solution and also upon the temperature of the solution. Therefore, when adding the ammonium nitrate either as a solution in the solvent or as the solid material at about normal or room temperature, it is preferable to introduce the ammonium nitrate in small increments over a period of time so as to obtain a uniform admixture at the time the gel point is reached. By heating the polyurethane solution and stirring in the solid ammonium nitrate or ammonium nitrate solution at an elevated temperature, for example about 30°–70° C., preferably 40°–60° C., one can first obtain a solution from which the polyurethane can be precipitated or gelled by cooling to about room temperature or lower temperatures. It will of course be apparent that the gel point in terms of temperature and concentrations of polyurethane and ammonium nitrate can be readily determined by a few preliminary tests.

In forming the polyurethane gel, a large proportion of the liquid solvent separates out as an excess liquid phase as distinguished from the solvent which remains as the dispersion medium or the liquid phase of the gel itself. It is a special advantage of the method according to the invention that the excess liquid solvent which separates out during gelling can be removed not only by centrifuging but also by evaporation, preferably under a vacuum in order to avoid heating the gel back above its gel point. Since the solvent is the only volatile substance present, any excess over that required to form the gel can be easily removed at low cost while stirring in the vacuum. Where there is a large excess of the solvent which has initially separated from the gel, it may be preferable to employ a centrifuge so as to remove at least the bulk of this excess solvent. In either case, the liquid solvent is recovered in pure form and can be reused without any extensive repurification. Surprisingly, evaporation of the excess liquid solvent in a vacuum does not produce air bubbles or void spaces in the gel formed by the polyurethane, and there is obtained a very homogeneous gel which can be immediately used for coating a suitable substrate. Previous methods of preparing polymer gels do not offer this possibility of drawing off the excess liquid phase from the gel by evaporation in a vacuum, because the non-solvent precipitating or gelling agent is usually too volatile so that a bubble-free gel could not be produced.

The following examples are intended only as a further illustration of the invention and the manner in which a microporous coating can be produced from the polymer gel without otherwise limiting the invention except within the spirit and scope of the appended claims. All percentages are by weight unless otherwise specified.

EXAMPLE 1

40 grams of polyurethane are dissolved in 160 grams of dimethyl formamide in a three-necked flask at approximately 50° C. To this initial mixture one slowly adds a solution of ammonium nitrate in dimethyl formamide (30% by weight) at room temperature until phase separation through gel formation occurs. The gel point is reached when the substance initially adhering to the glass wall loses its adherence owing to phase separation and slides or glides off the glass wall. After the addition of 65 ml. of ammonium nitrate solution, this gel point is reached. The gel is centrifuged at room temperature for 10 minutes at 10,000 g. During this centrifuging process, 27 ml. of a liquid phase are separated, this liquid containing in addition to dimethyl formamide and ammonium nitrate only 1 to 2% of a low molecular weight polyurethane. At room temperature the polyurethane gel remains cloudy because of minute liquid droplets trapped therein. The gel becomes clear after raising the temperature very slightly.

EXAMPLE 2

The 30% ammonium nitrate solution in dimethyl formamide as prepared in Example 1 is added drop by drop to a 20% polyurethane solution at room temperature. In order to achieve gel formation, 70 ml. ammonium nitrate solution are employed for each 200 grams of the polyurethane solution in dimethyl formamide. Thereafter the gel is cooled to approximately 10° C., and 85 ml. of a liquid phase are separated by centrifuging. Thereafter heat is lightly applied until a clear gel results.

EXAMPLE 3

At 40° C., 350 ml. of a 30% ammonium nitrate solution in dimethyl formamide are added to 1,000 grams of a 20% polyurethane solution over a period of 15 minutes in a closed glass bulb. During this addition, a clear liquid initially occurs which then becomes slowly cloudy during subsequent cooling. This cloudiness is attributed to a gel formation. At approximately 25° C., the gel point is reached. Then the mixture is further cooled to temperatures somewhat below room temperature and centrifuged for 10 minutes. During this centrifuging, 360 ml. of a liquid phase can be separated. A clear gel is then obtained at room temperature.

EXAMPLE 4

300 grams of polyurethane are dissolved in a three-necked flask in 700 grams of dimethyl formamide at 50° C. To this solution at a temperature of 50° C., there is added drop by drop 250 ml. of a 30% ammonium nitrate solution preheated to 50° C. The result is a clear liquid. During cooling, a vacuum is applied at approximately 40° C. While stirring intensively, the mixture is degassed until room temperature is reached. A clear gel results which then becomes cloudy because of the occurrence of a second separate phase when the temperature is slightly decreased. At room temperature, no second liquid phase can be separated by centrifuging.

EXAMPLE 5

17 grams of solid pulverized ammonium nitrate are added little by little to 200 grams of a 20% polyurethane solution in dimethyl formamide at 50° C. in a closed round-bottom flask while stirring well. After cooling to room temperature and 10 minutes of centrifuging, a few drops of a separate liquid phase can be removed. A cloudy gel is obtained as in the previous examples.

EXAMPLE 6

534 grams of a 30% polyurethane solution in dimethyl formamide heated to approximately 60° C. are well mixed with 30 grams of carbon black (22.7% in glycol). After adding 258 ml. dimethyl formamide and 200 grams of a 20% polyvinyl chloride solution in dimethyl formamide, the resulting composition is mixed with 180 grams of a 30% ammonium nitrate solution in dimethyl formamide, and 260 ml. dimethyl formamide are distilled off under vacuum. During this distillation, a gel is formed which does not divide into two separate phases even after prolonged standing.

EXAMPLE 7

300 grams of polyvinyl chloride are dissolved in 700 grams of dimethyl formamide at approximately 30° C. in a closed flask. 40 grams of this solution are then mixed with 200 grams of a 20% polyurethane solution in dimethyl formamide. Into this liquid mixture, there is added drop by drop, at approximately 10° C., 59 ml. of a 30% ammonium nitrate solution in dimethyl formamide over a period of 15 minutes. During this introduction of ammonium nitrate, a cloudy gel is obtained which is degassed while heating to room temperature in a vacuum. At room temperature this gel is still slightly cloudy.

EXAMPLE 8

To a mixture of 1,200 grams of a 30% polyurethane solution in dimethyl formamide and 600 grams of a 15% polyvinyl chloride solution in dimethyl formamide, there is added drop by drop 495 grams of the following solution at approximately 60° C.: 480 grams of a 30% ammonium nitrate solution in dimethyl formamide mixed with 10 ml. of a 25% solution of a dispersing agent in water and 100 grams of a paste paint, consisting of 22.8% carbon black in glycol. The resulting composition is degassed at 40° C. and 35 mm. Hg in a vacuum container while being stirred and cooled to 25° C. The resulting brushable gel paste can be used immediately for coating flat shaped articles.

The gels obtained from Examples 1 to 8 were tested with respect to their water vapor permeability as follows:

On a papermaking machine, a non-woven fibrous fleece is produced from a fiber dispersion of 500 grams of a fibrous mixture consisting of polyamide (nylon) and regenerated cellulose (viscose) fibers in 100 liters of water. After drying the fibrous web at 100° C., it is saturated with a polyurethane solution at 50° C. The fleece impregnated in this manner is then led into a water bath maintained at 50° C. for the precipitation of the polyurethane and subsequently washed with water to provide a solvent-free impregnation. The substrate produced in this manner and dried at 85° C. is then ground down on both sides to the desired thickness. The gels to be tested are laid onto this substrate by means of a wiper blade to a layer thickness of 1 mm. The coated substrate is then led into a water bath maintained at 45° C. at a speed of 40 cm. per minute for the precipitation or hardening of the polyurethane surface film. The surface coating is subsequently washed free of dimethyl formamide and is then dried at 80° C. and tested for water vapor permeability according to DIN 53333 (German Industrial Standard). The following results were observed:

| Gel from Example— | Water vapor permeability (g./m.²/24 hrs.) |
|---|---|
| 1 | 710 |
| 2 | 746 |
| 3 | 695 |
| 4 | 720 |
| 5 | 733 |
| 6 | 658 |
| 7 | 673 |
| 8 | 690 |

Polyurethanes which are suitable as a coating material or surface layer on a flat substrate, especially in the production of artificial leather, are generally quite well known in this art. In generally, polyurethanes are produced by reacting diisocyanates with substances containing terminal hydroxy groups, especially such polymers as polyethers, polyesters or polyesteramides, often with the further interaction of diamines, water or glycols. For purposes of the present invention, the polyurethane must be soluble in organic solvents and capable of being hardened or solidified by treatment with water so as to provide a relatively insoluble, cross-linked polymer structure.

Suitable polyurethanes of this type are described in detail in such references as U.S.P. 2,871,218 (Goodrich) and U.S.P. 3,190,766 (Du Pont).

In preparing the polyurethane, the diisocyanate most commonly employed is tolylene diisocyanate although it is also possible to use other diisocyanates such as hexamethylene diisocyanate, naphthalene diisocyanates, phenylene diisocyanates, methylene-bis-phenyldiisocyanate, or alkylene and arylene diisocyanates.

Suitable polymers for reaction with the diisocyanate include the following:

(a) Polyethers: polyethyleneether glycols, polypropyleneether glycols, polyhexamethyleneether glycols and others.

(b) Polyesters: tetramethylene glycol adipate, hexamethylene glycol adipate, hexamethylene glycol terephthalate and others.

(c) Polyesteramides: amides of the above-noted polyesters.

Depending upon the amount of cross-linking desired in the polyurethane polymer, it is also possible to introduce glycols such as ethylene glycol, tetramethylene glycol or hexamethylene glycol; diamines such as ethylene diimine, phenylene diamine or dimethyl piperazine or even small amounts of diethylene diimine.

For purposes of the present invention, it is desirable to avoid extensive cross-linking in the initial polyurethane to be formed into a gel, but it will be understood that those skilled in this art can easily make suitable polyurethanes which are soluble in an organic solvent and can be readily gelled therein.

Organic solvents which dissolve the polyurethane are also well known in this art. In referring to the use of the organic solvent for dissolving the polyurethane and forming a polymer solution herein, it will be recognized that one does not produce a true solution but a suspension of the polymer in the solvent in the form of a so-called "colloidal solution." The term "solution" is therefore employed throughout this specification and claims so as to broadly include such colloidal solutions or suspensions. For purposes of the present invention, it is particularly desirable to employ those organic solvents which are capable of dissolving a relatively large quantity of ammonium nitrate. The following table lists the preferred solvents and their maximum content of ammonium nitrate, i.e., the concentration of a saturated ammonium nitrate solution:

| Solvent: | Conc. of NH₄NO₃ in sat. solution (per percent by weight) |
|---|---|
| Dimethylformamide | 33 |
| Dimethylacetamide | 32 |
| Dimethylsulfoxide | 40 |

Those solvents are the only ones which dissolve ammonium nitrate in a range of about 30% to 40% by weight and which are miscible with water so as to be easily washed out of the gel after it has been coated on a substrate.

While the concentration of the polyurethane and the ammonium nitrate in the solvent are not critical, it is generally desirable to work within a ratio by weight of polyurethane to solvent of about 20:75 to 30:65, preferably about 20:72 to 30:68, and a ratio by weight of ammonium nitrate to solvent of about 3:65 to 10:75. The amount of ammonium nitrate required to precipitate or gel the polyurethane can generally be about 15 to 50% by weight with reference to the polyurethane.

The polyurethane solution employed according to the invention may also contain up to about 30% by weight, with reference to the polyurethane, of another polymer, including any of those polymers which are known to be compatible with polyurethane. Polyvinyl chloride is particularly useful as such an additional polymer in the preparation of a coatable gel which can then be hardened into a leather-like product. Of course, it is also possible to add coloring agents such as pigments or dyes or to include thickening agents, fillers, or extenders in a conventional manner. These and other variations will be readily apparent to a skilled chemist in this art.

In each of the above Examples 1–8, the particular polyurethane employed had the following composition: methylene-bis-(4-phenyl) - diisocyanate, tetramethylene glycol adipate, molecular weight 850, and tetramethylene glycol. This polyurethane is especially adapted to give the appearance of an artificial leather when applied as a coating onto a fibrous substrate, and it will be recognized from the results obtained when coating this polyurethane in accordance with the invention that the resulting film or surface layer exhibits very satisfactory permeability to water vapor. At the same time, the microporous structure of the polyurethane completely seals the surface of the leather-like material against liquid water so as to fully protect the substrate in the desired manner. The finished product is quite flexible and can be readily made into any number of leather products with especially good hygienic properties. Although the present invention is especially useful in this production of artificial leather products, it should be understood that the invention is generally applicable to any polyurethane coating or film which must be permeable to water vapor or other gases and must therefore have a microporous open-channeled structure. Thus, other polyurethanes may also be prepared in exactly the same manner and treated in accordance with this invention to yield microporous surface coatings which otherwise range from relatively solid, rigid, or hard structures to very flexible, pliable or elastomeric structures. Thus, in addition to applications requiring a flexible leather-like product, the present invention also provides a microporous polymer coating for such articles as various rigidized containers, including luggage, brief cases and the like, and in many other areas where a surface with a pleasing appearance is required.

The invention is hereby claimed as follows:

1. A composition consisting essentially of a polyurethane dissolved in a water-miscible organic solvent and ammonium nitrate in an amount sufficient to cause said polyurethane to gel.

2. A composition as claimed in claim 1 wherein said organic solvent is a member selected from the class consisting of dimethyl formamide, dimethyl acetamide and dimethyl sulfoxide.

3. A composition as claimed in claim 1 wherein said organic solvent is dimethyl formamide.

4. A composition as claimed in claim 1 containing up to 30% by weight, with reference to said polyurethane, of another gel-forming polymer which is dissolved in said organic solvent and which is compatible with said polyurethane.

5. A composition as claimed in claim 1 wherein the ratio by weight of polyurethane to solvent is about 20:75 to 30:65 and the ratio by weight of ammonium nitrate to solvent is about 3:65 to 10:75.

6. A composition as claimed in claim 1 wherein said polyurethane is composed of methylene-bis-(4-phenyl)-diisocyanate, polytetramethylene-glycol-adipate and tetramethylene glycol.

7. A composition as claimed in claim 4 wherein said other gel-forming polymer is polyvinyl chloride.

8. A method of preparing a polyurethane gel which comprises: dissolving said polyurethane in a water miscible organic solvent; adding ammonium nitrate to the polyurethane solution in a quantity sufficient to gel the polyurethane; and removing excess organic solvent which separates as a liquid phase from the gel.

9. A method as claimed in claim 8 wherein said ammonium nitrate is added in the form of a solution in the same organic solvent used to dissolve said polyurethane.

10. A method as claimed in claim 8 wherein said ammonium nitrate is added in the form of a solid to the polyurethane solution.

11. A method as claimed in claim 8 wherein said organic solvent is dimethyl formamide.

12. A method as claimed in claim 8 wherein said excess solvent is removed by centrifuging.

13. A method as claimed in claim 8 wherein said excess solvent is removed by evaporation under a vacuum.

References Cited

UNITED STATES PATENTS 3,190,766  6/1965  Yuan _____ 117—63

WILLIAM D. MARTIN, Primary Examiner

T. G. DAVIS, Assistant Examiner

U.S. Cl. X.R.

117—161, 63; 260—2.5, 32.6, 34.7